US006854556B1

(12) United States Patent
Yamamoto et al.

(10) Patent No.: US 6,854,556 B1
(45) Date of Patent: *Feb. 15, 2005

(54) MOTOR OPERATED POWER STEERING DEVICE

(75) Inventors: Tatsuhiro Yamamoto, Kashiwara (JP); Manabu Takaoka, Kashiba (JP)

(73) Assignee: Koyo Seiko Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1099 days.

(21) Appl. No.: 08/635,614

(22) Filed: Apr. 22, 1996

(30) Foreign Application Priority Data

May 1, 1995 (JP) ............................................. 7-132781
Jun. 30, 1995 (JP) ............................................. 7-188262

(51) Int. Cl.$^7$ ............................. B62D 5/04; B62D 5/10
(52) U.S. Cl. ...................... 180/444; 280/271; 180/443
(58) Field of Search ................................ 180/400, 443, 180/444, 412, 426–429; 280/771, 779

(56) References Cited

U.S. PATENT DOCUMENTS

| | | | | |
|---|---|---|---|---|
| 3,893,534 A | * | 7/1975 | Steinmann | 180/443 |
| 4,416,345 A | * | 11/1983 | Barthelemy | 180/444 |
| 4,676,331 A | * | 6/1987 | Iwaki et al. | 180/444 |
| 4,874,053 A | * | 10/1989 | Kimura et al. | 180/443 |
| 4,901,831 A | * | 2/1990 | Ito et al. | 180/444 |
| 5,482,128 A | * | 1/1996 | Takaoka et al. | 180/444 |

FOREIGN PATENT DOCUMENTS

| | | |
|---|---|---|
| DE | C-916 370 | 8/1954 |
| DE | A-20 18 367 | 7/1971 |
| EP | A-0 630 800 | 12/1994 |
| JP | SHO 60-149322 | 10/1985 |
| JP | 2-15576 | 1/1990 |
| JP | 2-120178 | 5/1990 |
| JP | HEI 5-262243 | 10/1993 |
| JP | HEI 8-80858 | 3/1996 |

OTHER PUBLICATIONS

Plastics Technology; Robert V. Milby; pp. 486–489, 1973.*
Materials and Methods of Architectural Construction; Parker. Gay & MacGuire; pp. 326–327, 1958.*
Elements of Physics, pp. 224–228; Shortley and Williams, 1965.*
Standard Handbook for Civil Engineers; pp. 6.4–6.5, Merritt, F.S.; Loftin, M.K.; and Ricketts, J.T., 1983.*
"Toleranzhülsen" a Dr. Tretter Maschinenelemante Göppingen brochure, 20 pages.
"Rencol Tolerance Rings + Bearings, Rencol Tolerance Rings + Torque Transfer", marketing literature, 15 pages.
Correspondence between Rencol Tolerance Rings and Opel, Project Centre Diesel, dated Jun. 5, 1994, Jul. 13, 1994, Feb. 27, 1995 and Sep. 22, 1995.

(List continued on next page.)

*Primary Examiner*—Eileen D. Lillis
*Assistant Examiner*—R. Johnson
(74) *Attorney, Agent, or Firm*—Jacobson Holman PLLC (57) ABSTRACT

A motor operated power steering device which transmits rotational force from a steering assistance motor to a steering shaft by way of a gear fitted around the outer circumference of the steering shaft. A torque limiter fitted in between the steering shaft and the gear comprises a torque setting member, which is subject to diametric deformation as a result of being fitted in between the outer circumference of the steering shaft and the inner circumference of the gear. Diametric force is applied to the steering shaft and the gear in accordance with the diametric deformation of the torque setting member. The limit torque value of the torque limiter corresponds to the diametric deformation of the torque setting member.

3 Claims, 7 Drawing Sheets

OTHER PUBLICATIONS

"Tolerance Rings", Engineering Technical File No. 92, Engineering Aug. 1981, pp. I, 11, 111 and V.

Rencol Rings, an EPP Inc. brochure—List of Common Sizes, 18 pages.

"Bagues de tolérance", a Nauder Division Industrie brochure, CAT.2322, 20 pages.

La bague de tolérance, un élément d'assemblage aux multiples possibilités, MECANIC, No. 2, 1963, pp. 39–45.

"Tolerance Ring," *Global Design News*, Jan./Feb. 1994.

"Rencol Tolerance Rings: Design Notes," Jan. 1994.

J. Penn et al., "The Application of Tolerance Rings in Anti–Theft Steering Column Assemblies," *SAE Technical Paper Series 940868, International Congress & Exposition*, Feb. 28–Mar. 3, 1994.

* cited by examiner

MOTOR OPERATED POWER STEERING DEVICE

FIELD OF THE INVENTION

The present invention relates to a motor operated power steering device which incorporates a torque limiter to combat the application of excessive torque to the steering shaft.

DESCRIPTION OF THE RELATED ART

In a motor operated power steering device which incorporates a steering shaft, a gear fitted around the circumference of the steering shaft, and a motor that transmits its rotational force to the steering shaft by way of the gear for the purpose of assisting the steering operation, the motor is seriously damaged if excessive torque is applied to the steering shaft as a result, for example, of the driver's vehicle mounting a roadside curb. Again, if output is increased by using the gear to increase the deceleration ratio of the rotational speed of the motor, the diameter of the gear must also be increased in order to combat the impact load arising out of the torque action on the steering shaft. This serves to prevent the device from being made more compact. For the reasons outlined above, a torque limiter is provided between the motor and the steering shaft.

In the past, the torque limiter are normally incorporated into the motor. These mechanisms are operated by causing the motor's output shaft to slip whenever the torque acting on the shaft is reached a predetermined limit value.

However, when the torque limiter is incorporated into the motor in this way, it is prevented from functioning if the motor's output shaft is locked for some reason such as the occurrence of an accident. In this sort of situation, the steering wheel becomes unusable. Another problem is that the teeth of the gear which transmits the rotational force of the motor to the steering shaft are sometimes made of a synthetic plastic in order to reduce noise. Teeth of this sort is broken by the application of excessive torque and this causes the gear rotation to lock. The torque limiter incorporated into the motor does not function under circumstances of this sort and the steering wheel becomes unusable. Another problem is that in transmission systems in which the rotational force of the motor is transmitted to the steering shaft by way of gears, the efficiency of transmission of the gears tends to vary by the individual difference of the gears. It is for this reason difficult to set the limit torque value precisely within the predetermined setting range. Again, the ratio of transmission of the rotational force through the gears, such as a worm wheel and a worm is increased. In this sort of case, the limit torque value must be set very precisely and this means using a high precision torque limiter.

One possible alternative to the above configurations is to fit a torque limiter in between the gear and the steering shaft. For example, the motor operated power steering device disclosed in Japanese patent laying open gazette H2-120178 has a mechanism which generates a force in order to pinch a plurality of friction plates, that rotate in unison with the gear, and a plurality of friction plates, that rotate in unison with the steering shaft, in the axial direction of the steering shaft. The limit torque is in this case set in accordance with the frictional resistance between the different sets of friction plates. This device is also provided with a mechanism which enables the limit torque value to be adjusted by varying the force with which the friction plates are pinched.

The above mechanism which needs a plurality of friction plates to be pinched, however, call for the use of a large number of parts while at the same time increasing the number of man/machine hours required for manufacture of the device. The limit torque value is also altered by the cumulative effect of inaccuracies in the axial dimensions of the friction plates. It is difficult under these circumstances to ensure that the limit torque value is set accurately within the predetermined setting range. Again, the need for the limit torque value adjustment mechanism also increases the number of parts required and complicates the configuration of the device.

In the motor operated power steering device disclosed in Japanese utility model laying open gazette H2-15576, the limit torque is set in accordance only with the press fit force with which the steering shaft is forced into the gear.

However, if the limit torque value is set in accordance only with the press fit force with which the steering shaft is forced into the gear, the press fit force must be gauged very precisely. This means that the outer circumference of the steering shaft and the inner circumference of the gear must be machined extremely accurately. This degree of machining accuracy is in practice difficult to achieve and this makes it difficult to ensure that the limit torque is set precisely within the predetermined setting range.

In an alternative motor operated power steering device disclosed in the Japanese utility model laying open gazette H2-15576, the gear is fitted such that it is able to move in an axial direction along the steering shaft. The gear is pressed onto a member fitted on the steering shaft via a plurality of friction plates by an axial force derived from the axial deformation of a spring. In this case the limit torque value is set in accordance with the axial force. This device is also fitted with a mechanism which enables the limit torque value to be adjusted by varying the axial deformation of the spring.

However, for the mechanism which presses the gear onto the member fitted on the steering shaft via the plural friction plates by the axial force derived from the axial deformation of the spring, a large number of parts are required and a greater number of man/machine hours is required to complete the manufacturing process. The limit torque is also altered by the cumulative effect of inaccuracies in the axial dimensions of the friction plates and the gear. It is difficult under these circumstances to ensure that the limit torque value is set accurately within the predetermined setting range. Again, the need for the limit torque adjustment mechanism also increases the number of parts required and complicates the configuration of the device. Also, if the gear is a worm wheel or the like, when a rotational force is transmitted to the clockwise direction by the gear, an axial force acts in one direction on the gear, and when a rotational force is transmitted to the counterclockwise direction by the gear, an axial force acts in the other direction on the gear. Thus, when the rotational force is transmitted to the clockwise direction, the gear moves by deforming the spring in an axial direction. However, when the rotational force is transmitted to the counterclockwise direction, the gear comes into contact with the member fitted on the steering shaft, so that the gear can not move. Therefore, the limit torque value at the time when the steering shaft is rotating to the clockwise direction differs from the limit torque value at the time when it is rotating to the counterclockwise direction.

It is the object of the present invention to provide a motor operated power steering device which can resolve the problems outlined above.

SUMMARY OF THE INVENTION

The motor operated power steering device according to the present invention comprises a steering shaft, a gear fitted around the outer circumference of the steering shaft, a steering assistance motor which transmits its rotational force by way of the gear to the steering shaft, and a torque limiter fitted in between the steering shaft and the gear.

It is the first distinguishing feature of the motor operated steering device of the present invention that the torque limiter comprises a torque setting member, which is subject to diametric deformation as a result of being fitted in between the outer circumference of the steering shaft and the inner circumference of the gear, that the torque setting member causes a diametric force corresponding to its diametric deformation to act on the steering shaft and the gear, and that the limit torque value of the torque limiter corresponds to the diametric deformation of the torque setting member.

According to the constitution of the presence of the first distinguishing feature of the present invention, a diametric force corresponding to the diametric deformation of the torque setting member is caused to act on the steering shaft and the gear, and thus frictional resistance between the torque setting member and the steering shaft and frictional resistance between the torque setting member and the gear are generated. These two frictional resistances serve to transmit torque between the steering shaft and the gear. The limit torque value is determined in accordance with either one of these frictional resistances. In other words, when the transmission torque between the steering shaft and the gear exceeds the limit torque value, relative slippage is produced either between the torque setting member and the gear or else between the torque setting member and the steering shaft, whichever offers the least frictional resistance. This slippage gives rise to relative rotation between the steering shaft and the gear, that is, the torque limiter effectively functions.

It is the second distinguishing feature of the motor operated power steering device of the present invention that the torque limiter comprises a torque setting member, which is subjected to diametric deformation as a result of being fitted in between the outer circumference of the steering shaft and the inner circumference of the gear, that the torque setting member causes a diametric force corresponding to its diametric deformation to act on the steering shaft and the gear, that the steering shaft is forced into the gear, and that the limit torque value of the torque limiter corresponding to the total of the first frictional resistance, which corresponds to the diametric deformation of the torque setting member, and the second frictional resistance, which corresponds to the press fit force with which the steering shaft is forced into the gear.

According to the constitution of the presence of the second distinguishing feature of the present invention, a diametric force corresponding to the diametric deformation of the torque setting member is caused to act on the steering shaft and the gear, and thus frictional resistance between the torque setting member and the steering shaft and frictional resistance between the torque setting member and the gear are generated. The smaller of the two frictional resistances is treated as the first frictional resistance. The second frictional resistance is generated between the steering shaft and the gear by forcing the steering shaft into the gear. The first frictional resistance corresponds to the diametric deformation of the torque setting member. The second frictional resistance corresponds to the press fit force with which the steering shaft is forced into the gear. The total of the first and second frictional resistances serve to transmit torque between the steering shaft and the gear. The limit torque value is determined in accordance with the total of the first and second frictional resistances. In other words, when the transmission torque between the steering shaft and the gear exceeds the limit torque value, relative slippage is produced either between the torque setting member and the gear or else between the torque setting member and the steering shaft, whichever offers the least frictional resistance. Relative slippage is also produced between the steering shaft and the gear. This dual slippage gives rise to relative rotation between the steering shaft and the gear, that is, the torque limiter effectively functions.

In the motor operated power steering device of the present invention, which incorporates the first and second distinguishing features outlined above, the torque limiter is fitted in between the steering shaft and the gear. Thus, even if rotation of the motor's output shaft or the gear is locked, the torque limiter can continue to function and this enables the steering wheel to continue to be used with effect. The limit torque value can be set without regard to the deceleration ratio of the rotational force of the motor in the gear. This enables the limit torque value to be set precisely within the predetermined setting range. There is, moreover, no longer any need to set the limit torque value as precisely as is necessary in the case of a torque limiter which is incorporated into the motor. Also, even if each of distinct types of vehicles has in different deceleration ratio of the rotational force of the motor in the gear, there is no need to set the limit torque to a different value for each type of vehicle.

The limit torque value can be set in accordance with the diametric deformation of the torque setting member in the motor operated power steering device having the first distinguishing feature of the present invention. Also, the limit torque value can be set in accordance with the diametric deformation of the torque setting member and the press fit force with which the steering shaft is forced into the gear in the motor operated power steering device incorporating the second distinguishing feature of the present invention. Thereby, even if the gear is a worm wheel, a helical gear, or the like, which is subject to axial force when the rotational force is transmitted, it is possible to prevent the limit torque value at the time when the steering shaft rotates to the clockwise direction and the limit torque value at the time when the steering shaft rotates to the counterclockwise direction from being different to each other.

The only component part, which is required to configure the above torque limiter with the prior existence of the steering shaft and the gear, is the torque setting member. This enables a reduction in the number of component parts used and in the number of man/machine hours required at the manufacturing stage.

In the motor operated power steering device incorporating the first distinguishing feature of the present invention, the limit torque can be set only by reference to the diametric deformation of the torque setting member. This makes it easier to set the limit torque to a value within the predetermined setting range than if the limit torque value is set only by reference to the press fit force with which the steering shaft is forced into the gear.

In the motor operated power steering device incorporating the second distinguishing feature of the present invention, the limit torque value can be set in accordance with the total of the first frictional resistance, which corresponds to the diametric deformation of the torque setting member, and the second frictional resistance, which corresponds to the press fit force with which the steering shaft is forced into the gear. In this case, the torque setting member can be made smaller than in cases in which the limit torque value is set only by reference to the value of the first frictional resistance, and thus the whole device can be made more compact. Again, in this case, the press fit force can be set more roughly than in cases in which the limit torque is set only by reference to the press fit force. There is thus no need to machine the outer circumference of the steering shaft and the inner circumference of the gear at the press fit area with extremely accuracy. There is thus no difficulty in setting the limit torque value to a value within the predetermined setting range.

In the motor operated power steering device incorporating the second distinguishing feature of the present invention, it is desirable that the first frictional resistance is made greater than the second frictional resistance. This enables the press fit force to be set more roughly, which in turn makes it easier to set the limit torque value to a value within the predetermined setting range.

It is desirable that the torque setting member has a characteristic, in that when the diametric deformation of the torque setting member is less than a specific value, the diametric force increases in proportion to the diametric deformation, and when the diametric deformation exceeds the specific value, the ratio of increase in the diametric force to the diametric deformation is smaller than that at the time when the diametric deformation is below the specific value, and that the diametric deformation of the torque setting member is set to a value in the range in which the diametric deformation exceeds the specific value.

This configuration ensures that the ratio of increase in the diametric force to the diametric deformation of the torque setting member is smaller than that at the time when the diametric force increases in proportion to the diametric deformation. Thereby, even if the diametric deformation of the torque setting member changes from a design value by the machining tolerance of the outside diameter of the steering shaft and the machining tolerance of the inside diameter of the gear, it can be possible to reduce the change in the diametric force caused by the torque setting member. Thus, in the motor operated power steering device incorporating the first distinguishing feature of the present invention, the limit torque value, which is determined in accordance with the diametric force, can be set precisely to a value within the predetermined setting range. Similarly, in the motor operated power steering device incorporating the second distinguishing feature of the present invention, the limit torque value, which is determined in accordance with both the diametric force and the press fit force with which the steering shaft is forced into the gear, can be easily set precisely to a value within the predetermined setting range. This makes a limit torque value adjustment mechanism unnecessary, eliminates the time taken adjusting the limit torque value, and simplifies the overall configuration of the device by reducing the number of component parts.

It is desirable that the motor operated power steering device comprises means for restricting an axial movement of the gear with respect to the steering shaft in the event that the gear is subjected to axial force at the time when the gear transmits the rotational force.

This configuration makes it possible that the axial movement of the gear against the frictional resistance applied by the torque limiter is prevented, so that displacement of the gear from its set position can be prevented. This prevents any change in the backlash and in the degree of engagement between this and other gears, thereby ensuring that there is no change in the feel of the steering. Again, the restricting means enables the precise position of the gear to be determined with respect to the steering shaft, when the gear is fitted around the steering shaft via the torque setting member. This enables the required level of precision to be achieved with ease at the assembly stage.

It is desirable that means for restricting a diametric movement of the gear with respect to the steering shaft is provided at the outsides of the two axial ends of the torque setting member. This configuration makes it possible that the diametric movement, against the diametric force caused by the torque setting member, of the gear with respect to the steering shaft is prevented at the outsides of the two axial ends of the torque setting member. This makes it possible to prevent the axial orientation of the gear from tilting with respect to the axial orientation of the steering shaft. This in turn prevents any change in the backlash and in the degree of engagement between this and other gears, thereby ensuring that there is no change in the feel of the steering.

DETAILED DESCRIPTION OF THE PREFERRED EMBODIMENTS

The following section provides a detailed description of the first preferred embodiment of the present invention by reference to FIGS. 1 to 6 below.

Figure 1:
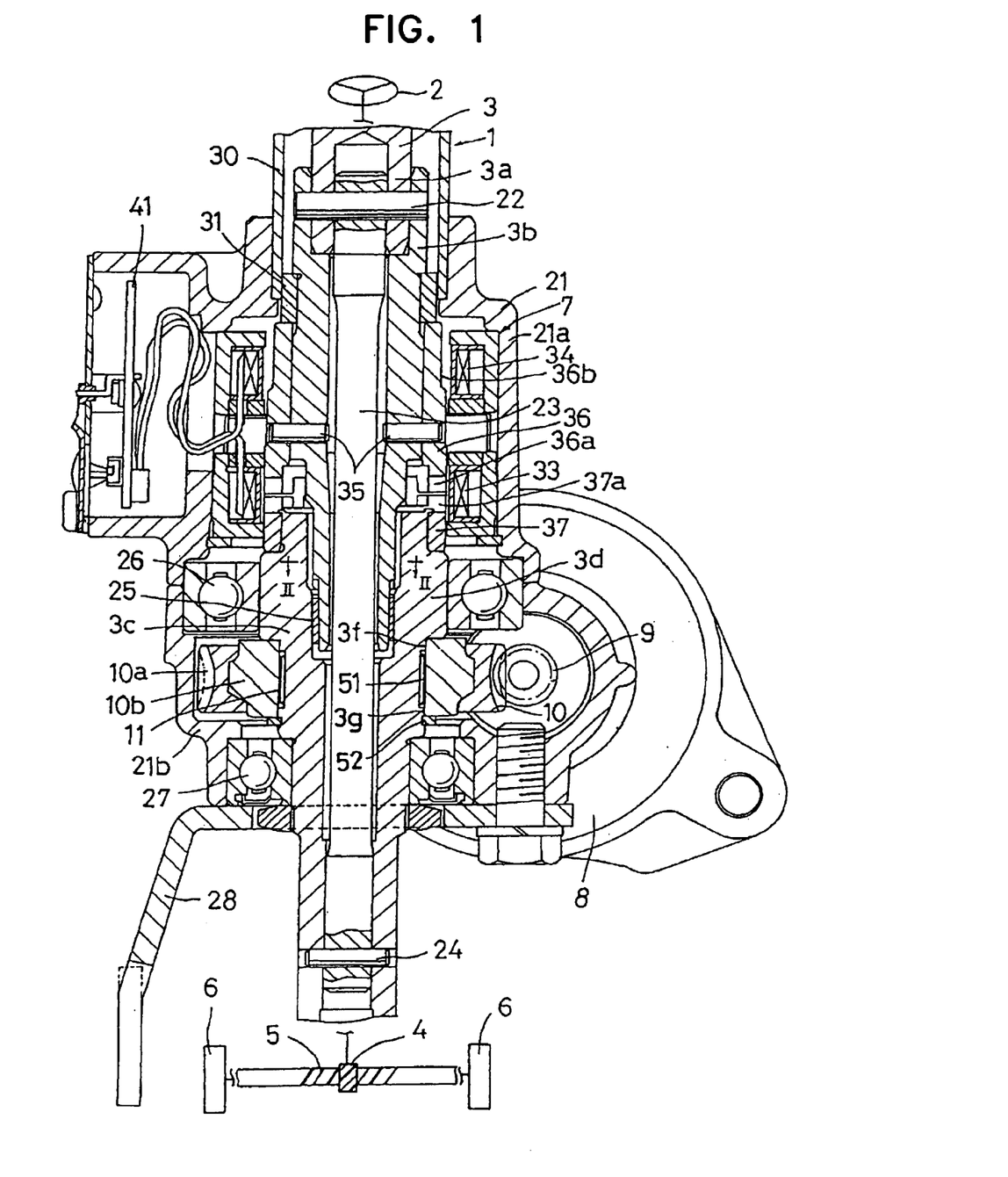
FIG. 1: A cross sectional view of the first preferred embodiment of the motor operated power steering device of the present invention.

The motor operated power steering device 1 shown in FIG. 1 transmits steering torque, which is generated by turning the steering wheel 2, by way of a steering shaft 3 to a pinion 4. The transmission of the steering torque causes movement in a rack 5 which meshes with the pinion 4. This varies the steering angle of the road wheels 6 which are linked to the rack 5 by way of tie-rods, knuckle arms, and the like (omitted from the drawing).

To supply steering assistance force in accordance with the steering torque transmitted by the steering shaft 3, a torque sensor 7, which detects the steering torque, a steering assistance motor 8, which is driven in accordance with the detected steering torque, and a worm 9 and worm wheel 10, whose function is to transmit the rotational force of the motor 8 to the steering shaft 3, are provided.

The worm wheel 10 has a toothed part 10a on the outer circumference side and a sleeve 10b on the inner circumference side which is united with the toothed part 10a. The toothed part 10a is made up of synthetic plastic and has teeth in its outer circumference. The sleeve 10b is made up of metal. To prevent the center of the pitch circle of the teeth of the toothed part 10a and the center of the sleeve 10b from being out of alignment, it is desirable that the teeth in the outer circumference of the toothed part 10a are machined after the toothed part 10a is united with the sleeve 10b.

The torque sensor 7 has a housing 21 which covers the aforementioned steering shaft 3. The housing 21 is made by joining two individual members 21a,21b. Inside the housing 21, the steering shaft 3 is divided into a first shaft section 3a, which is linked to the steering wheel 2, a cylindrical second shaft section 3b, which is linked by a pin 22 to the first shaft section 3a, and a cylindrical third shaft section 3c, which is connected to the second shaft section 3b by way of a bush 25 fitted around the outer circumference of the second shaft section 3b such that it is able to rotate relative to the second shaft section 3b. A torsion bar 23 is fitted through the center of the three shaft sections 3a,3b,3c as an elastic member. The torsion bar 23 is linked at one end by the aforementioned pin 22 to the first and second shaft sections 3a,3b and at the other end by another pin 24 to the third shaft section 3c. This configuration enables the second and third shaft sections 3b,3c to rotate elastically relative to each other in accordance with the steering torque.

Figure 2:
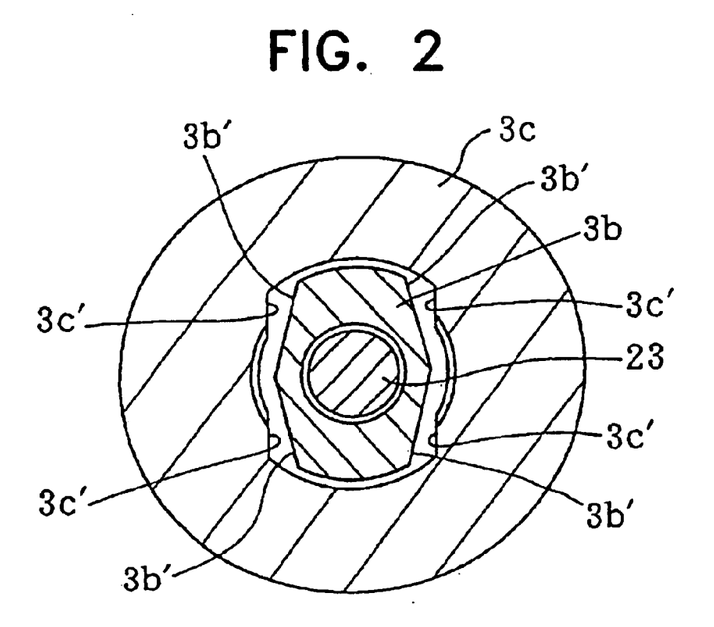
FIG. 2: A cross section taken on line II—II of FIG. 1.

As shown in FIG. 2, parts of the outer circumference of the second shaft section 3b and parts of the inner circumference of the third shaft section 3c are made up of mutually opposed non-circular sections 3b',3c'. By coming into contact with each other, the non-circular sections 3b' of the second shaft section 3b and the non-circular sections 3c' of the third shaft section 3c have the effect of confining the relative rotation of the two shafts 3b,3c within a fixed range. Limiting the relative rotation in this way has the effect of preventing the torsion bar 23 from being damaged by the application of excessive torque to the steering shaft 3.

The second shaft section 3b is supported through a bush 31 by the steering column 30, which is forced into the housing 21. The third shaft section 3c is supported by the housing 21 through two bearings 26,27. The worm wheel 10 is fitted around the outer circumference of the third shaft section 3c through a torque limiter 11, which is explained in more detail below. The aforementioned worm 9, which meshes with the worm wheel 10, is fitted to the output shaft of the aforementioned motor 8. The motor 8 is fixed to the housing 21. The housing 21 is fixed to the body of the vehicle by brackets 28.

The torque sensor 7 has a first detection coil 33 and a second detection coil 34, each of which is supported by the housing 21, a first magnetic detection ring 36, which is fitted around the outer circumference of the second shaft section 3b and is fixed by a pin 35 to the second shaft section 3b, and a second magnetic detection ring 37, which is forced on the outer circumference of the third shaft section 3c. The first and second detection rings 36,37 are positioned such that one end face of the first detection ring 36 and one end face of the second detection ring 37 are opposite to each other. A plurality of teeth 36a,37a are provided around the circumferences of their opposing end faces of the two detection rings 36,37. In the first detection ring 36, the outer circumference adjacent to the other end face has a narrow diameter part 36b whose diameter is narrower than the diameter of the outer circumference adjacent to the one end face. The first detection coil 33 surrounds the gap between the opposing end faces of the first and second detection rings 36,37. The second detection coil 34 surrounds the first detection ring 36.

Each of the two detection coils 33,34 are connected by wires to a printed circuit board 41 attached to the housing 21.

Figure 3:
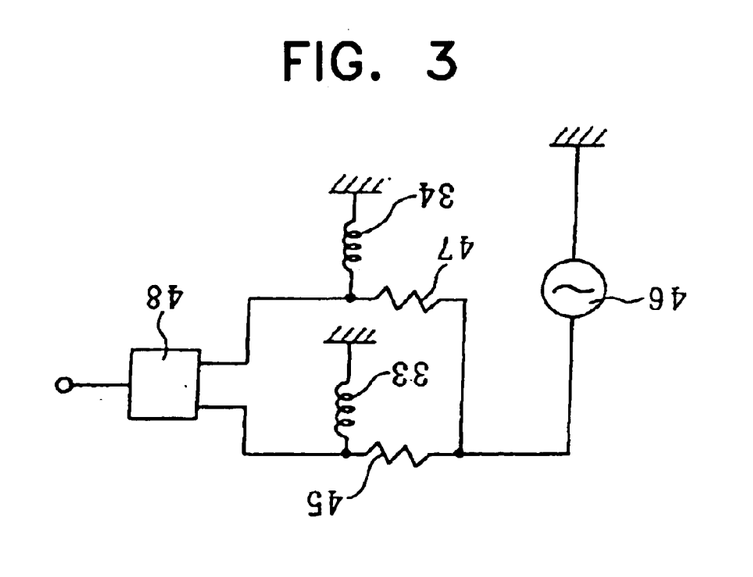
FIG. 3: Explanatory drawing illustrating the configuration of the torque sensor circuit of the preferred embodiments of the motor operated power steering device of the present invention.

The printed circuit board 41 contains the signal processing circuit shown in FIG. 3. To be more precise, the first detection coil 33 is connected to an oscillator 46 by way of a resistance 45. The second detection coil 34 is also connected to the oscillator 46 by way of a resistance 47. Each of the first and second detection coils 33,34 are connected to a differential amplifier 48. This configuration ensures that, when the torsion bar 23 twists in response to the transmission of torque, the first and second detection rings 36,37 rotate relative to each other. This relative rotation causes the opposing areas of the teeth 36a,37a on the first and second detection rings 36,37 in relation to axial direction to change. This change causes a change in the magnetic reluctance in the gap between the opposing teeth 36a,37a with respect to the magnetic flux of the first detection coil 33. The output of the first detection coil 33 changes in line with this change in magnetic reluctance. The transmitted torque is detected from this output. The second detection coil 34 is positioned so as to face the narrow diameter part 36b of the first detection ring 36. The diameter of the narrow diameter part 36b is determined such that, when there is no steering torque, the magnetic reluctance with respect to the magnetic flux of the second detection coil 34 and the magnetic reluctance with respect to the magnetic flux of the first detection coil 33 are equal. Therefore, fluctuations in the output of the first detection coil 33 due to temperature changes are made equal to the fluctuations in the output of the second detection coil 34 due to the temperature changes, so that the fluctuations in the output of the first detection coil 33 is canceled out by the differential amplifier 48. In other words, fluctuations due to temperature in the detected value of the transmitted torque are compensated for. The aforementioned motor 8 is driven in response to signals corresponding to the transmitted torque output by the differential amplifier 48. The output of the motor 8 is applied as steering assistance force to the steering shaft 3 by way of the aforementioned worm 9 and worm wheel 10.

Figure 4:
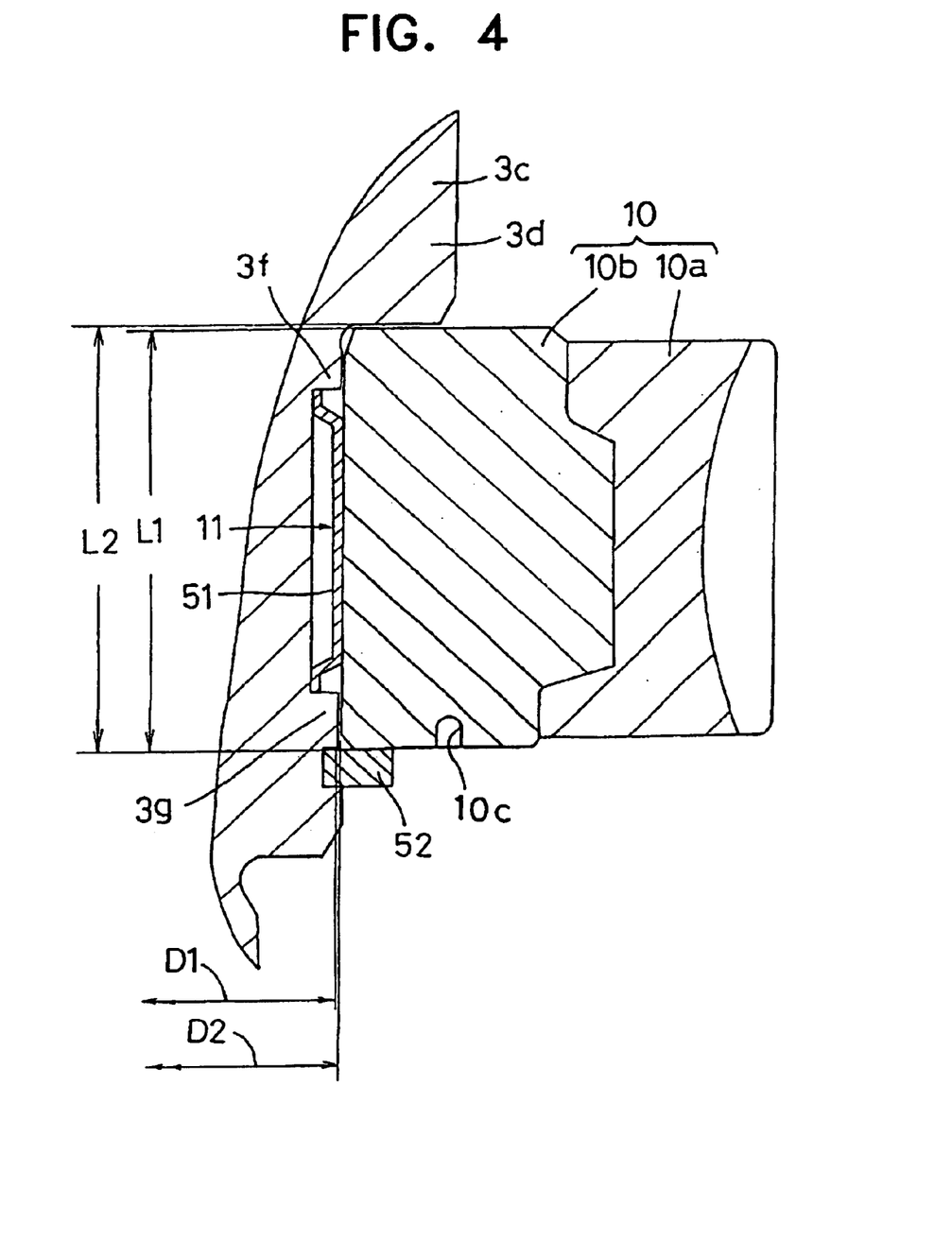
FIG. 4: A cross sectional view of a crucial part of the first preferred embodiment of the motor operated power steering device of the present invention.
Figure 5A:
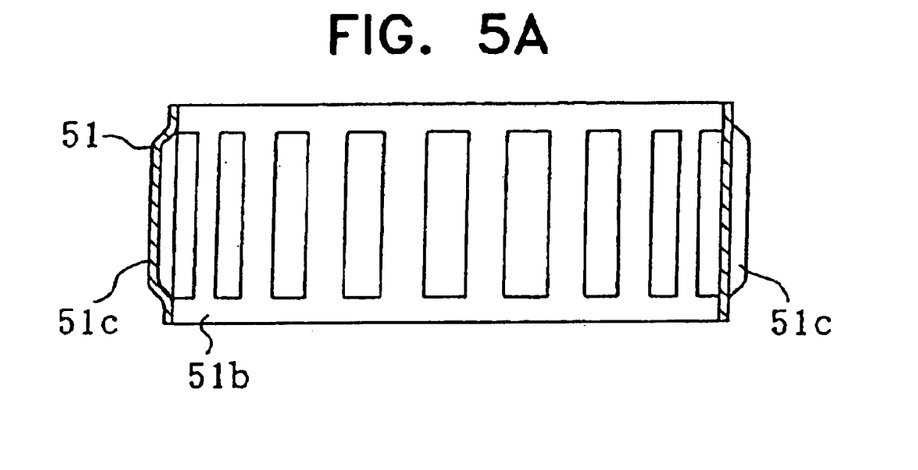
FIG. 5(A): A cross sectional view of the torque setting member of the torque limiter of the embodiments of the present invention.
Figure 5B:
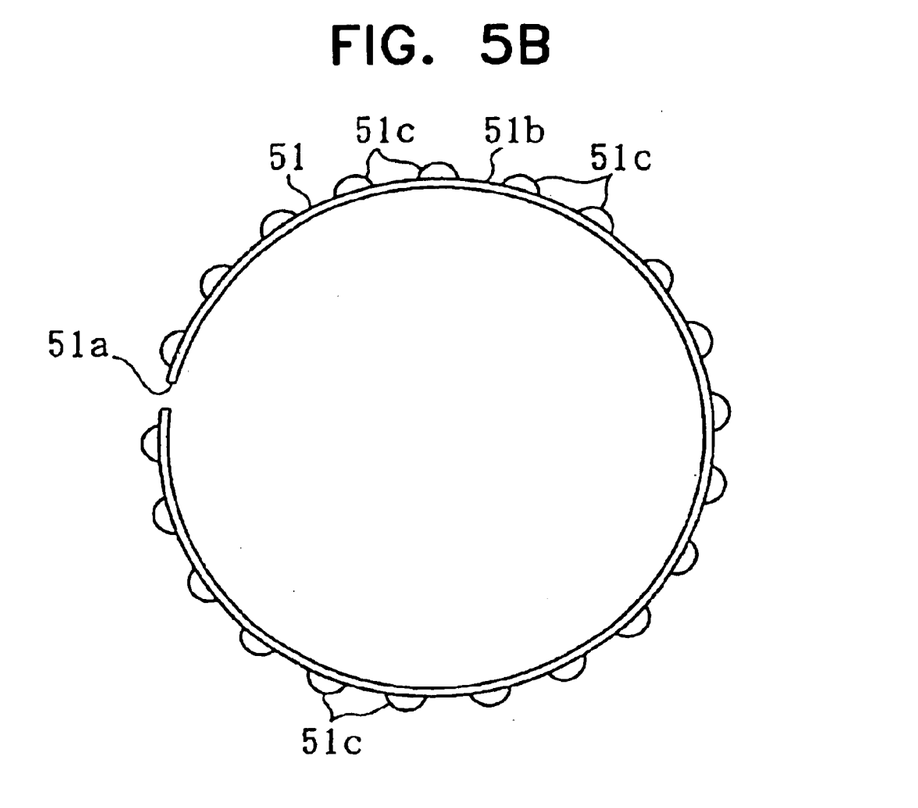
FIG. 5(B): A front view of the torque setting member.
Figure 6:
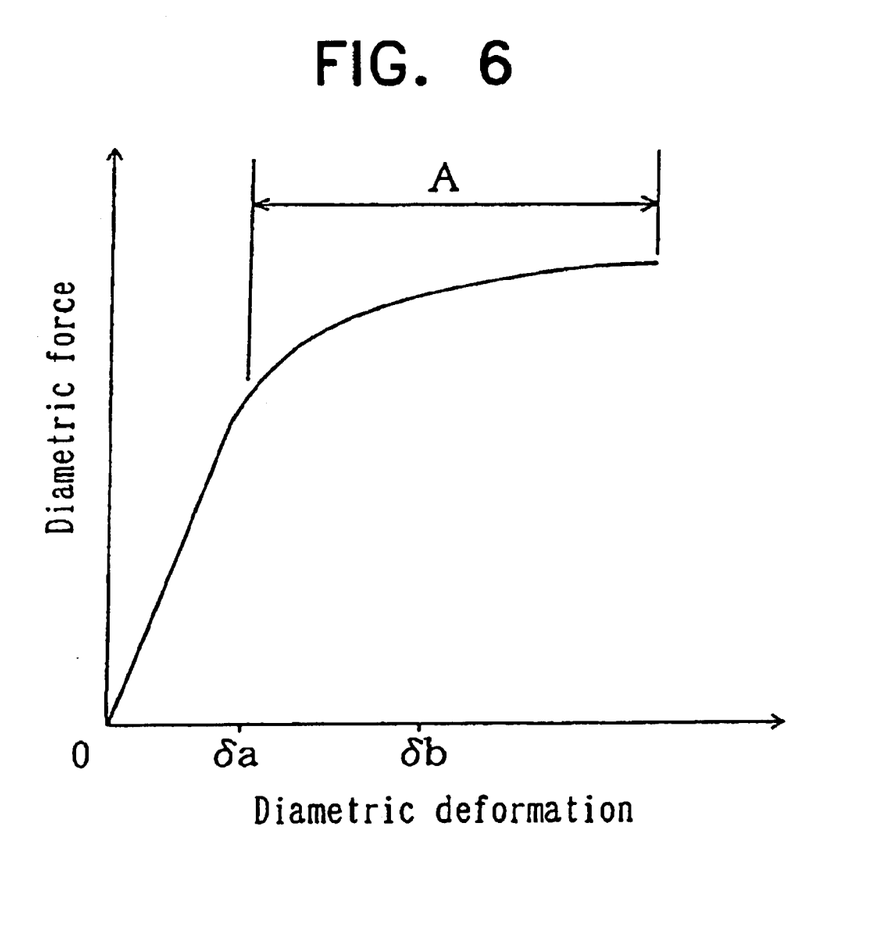
FIG. 6: A graphic illustration of the relationship between the diametric deformation and the diametric force of the torque setting member.

As shown in FIG. 4, the aforementioned torque limiter 11 comprises a torque setting member 51. The torque setting member 51 is fitted in between the outer circumference of the third shaft section 3c of the steering shaft 3 and the inner circumference of the worm wheel 10 such that it is subject to diametric deformation. As shown in FIGS. 5(A) and 5(B), the torque setting member 51 comprises a metal ring 51b with split 51a. The ring 51b has a plurality of semi-cylindrical projections 51c. The projections 51c are spaced equally around the circumference of the ring 51b such that they each project diametrically outwards from the circumference of the ring 51b. The torque setting member 51 causes a diametric force corresponding to its diametric deformation of each of the projections 51c to act on the steering shaft 3 and the worm wheel 10. A tolerance ring (SV type made by the Rencol Tolerance Rings Co.) can, for example, be used as the torque setting member 51. FIG. 6 graphs the relationship between the diametric deformation of the torque setting member 51 and the diametric force caused by the torque setting member 51. When the diametric deformation is less than a specific value δa, the diametric force increases in proportion to the diametric deformation. When the diametric deformation exceeds the specific value δa, that is, in a range A in the figure, the ratio of increase in the diametric force to the diametric deformation is smaller than that at the time when the diametric deformation is less than the specific value δa. The diametric deformation of the torque setting member 51 is set to a value 6b in the range A in which the diametric deformation exceeds the specific value δa.

The worm wheel 10 is subjected to axial force at the time when rotation of the worm 9 is transmitted to the steering shaft 3. Restricting parts are provided in order that the axial movement of the worm wheel 10 due to the axial force with respect to the steering shaft 3 against the frictional resistance between the worm wheel 10 and the torque setting member 51 is restricted. A flange 3d and a retaining ring 52 as shown in FIG. 4 serve as the restricting parts. The flange 3d is formed as a part of the outer circumference of the third shaft section 3c. The retaining ring 52 is fitted around the outer circumference of the third shaft section 3c. The flange 3d and the retaining ring 52 are positioned at a distance from each other in an axial direction. It is desirable that the difference between the axial size L1 of the worm wheel 10 and the axial gap L2 between the flange 3d and the retaining ring 52 is made as small as possible so as not to impede the relative rotation of the worm wheel 10 and the steering shaft 3. The gap can be set to something, for example, between zero and several tens of micrometers.

The diametric movement, against the diametric force caused by the torque setting member 51, of the worm wheel 10 with respect to the steering shaft 3 is restricted by restricting parts at the outsides of the two axial ends of the torque setting member 51. Two ring shaped projections 3f,3g is provided as the restricting parts. The projections 3f,3g are formed as a part of the outer circumference of the third shaft section 3c such that there is a space between them 3f, 3g in an axial direction. The torque setting member 51 is positioned in the space between the two projections 3f,3g. It is desirable that the gap between the outside diameter D1 of the two projections 3f,3g and the inside diameter D2 of the worm wheel 10 is made as small as possible so as not to impede the relative rotation of the worm wheel 10 and the steering shaft 3. The gap can be set to something, for example, between zero and several tens of micrometers. As an alternative embodiment, each of these restricting parts can be provided on the worm wheel 10 side.

In the configuration outlined above, a diametric force corresponding to the diametric deformation of the torque setting member 51 is caused to act on the steering shaft 3 and the worm wheel 10. Therefore, frictional resistance between the inner circumference of the torque setting member 51 and the outer circumference of the steering shaft 3 and the frictional resistance between the outer circumference of the torque setting member 51 and the inner circumference of the worm wheel 10 are generated. These two fictional resistance serve to transmit torque between the worm wheel 10 and the steering shaft 3. The limit torque is determined in accordance with the frictional resistance. In the present embodiment, the frictional resistance between the inner circumference of the torque setting member 51 and the outer circumference of the steering shaft 3 is made smaller than the frictional resistance between the outer circumference of the torque setting member 51 and the inner circumference of the worm wheel 10. The torque value at the point when the inner circumference of the torque setting member 51 and the outer circumference of the steering shaft 3 start to slip relative to each other is the limit torque value of the torque limiter 11. The limit torque value can be found by testing.

In the power steering device 1 described above, when a torque in excess of the limit torque value of the torque limiter 11 is applied to the steering shaft 3 as a result, for example, of the road wheel 6 of the driver's vehicle mounting a curb, the torque setting member 51 slips relative to the steering shaft 3. This slippage gives rise to the relative rotation between the steering shaft 3 and the worm wheel 10. This prevents the motor 8 from being damaged.

In the power steering device 1 outlined above, the torque limiter 11 is fitted in between the steering shaft 3 and the worm wheel 10. Thus, even if rotation of the output shaft of the motor 8 is locked, the torque limiter 11 continues to function and this enables the steering wheel 2 to continue to be used with effect. Similarly, if rotation of the worm wheel 10 is locked as a result of damage to the teeth of the toothed part 10a, the torque limiter 11 can continue to function. Again, since the limit torque value can be set without regard to the deceleration ratio of the rotational force of the motor 8 between the worm wheel 10 and the worm 9, it can be set precisely to a value within the desired setting range. There is also no need to set the limit torque value as precisely as is the case when the torque limiter is incorporated into the motor. Furthermore, even if each of distinct types of vehicles has a different deceleration ratio of the rotational force of the motor 8, there is no need to set the limit torque value to a different value for each type of vehicle.

In the power steering device 1 outlined above, the limit torque value can be set only by reference to the diametric deformation of the torque setting member 51. This enables a reduction in the number of component parts used and in the number of man/machine hours required at the manufacturing stage. This also enables the limit torque value to be set more easily to a value within the desired setting range than if the limit torque value is set only by reference to the press fit force with which the steering shaft is forced into the gear. It is also possible, even when axial force is applied to the worm wheel 10 during transmission of the rotational force of the motor 8, to prevent the limit torque value at the time when the steering shaft 3 rotates to the clockwise direction and the limit torque value at the time when the steering shaft 3 rotates to the counterclockwise direction from being different to each other.

In the power steering device 1 described above, the ratio of increase in the diametric force to the diametric deformation of the torque setting member 51 is smaller than that at the time when the diametric force increases in proportion to the diametric deformation. Thereby, even if the diametric deformation of the torque setting member changes from a design value by the machining tolerances of the outside diameter of the steering shaft 3 and the inside diameter of the worm wheel 10, it can be possible to reduce the change in the diametric force caused by the torque setting member 51. The limit torque value, which is determined in accordance with the diametric force, can thus be set precisely to a value within the desired setting range. This makes a limit torque value adjustment mechanism unnecessary, eliminates the time taken adjusting the limit torque value, and simplifies the overall configuration of the device 1 by reducing the number of component parts.

In the power steering device 1 described above, a flange 3d and a retaining ring 52 are used to restrict the axial movement of the worm wheel 10 with respect to the steering shaft 3 at the time when the worm wheel 10 is subjected to axial force during transmission of the rotational force of the motor 8. This prevents the worm wheel 10 from moving out of its set position, so that it prevents any change in the backlash and in the degree of engagement between the worm wheel 10 and the worm 9. There is thus no change in the feel of the steering. Also, when the worm wheel 10 is fitted to the steering shaft 3 through the torque setting member 51, the flange 3d can be used to determine the axial position of the worm wheel 10 with respect to the steering shaft 3. This enables the required level of precision to be achieved with ease at the assembly stage.

In the power steering device 1 described above, the diametric movement of the worm wheel 10 can be restricted by the projections 3f,3g. This prevents the axial orientation of the worm wheel 10 from tilting with respect to the axial orientation of the steering shaft 3. This prevents any change in the backlash and in the degree of engagement between the worm wheel 10 and the worm 9, ensuring that there is no change in the feel of the steering.

In the above embodiment, as shown in FIG. 4, the end face of the sleeve 10b of the worm wheel 10 contains an indentation 10c which is designed to allow the insertion of a tool. By using the tool inserted into the indentation 10c, the sleeve 10b can rotate without transmitting of rotation of the worm 9 to the worm wheel 10. This rotation can be used to confirm the limit torque value before integrating the sleeve 10b with the toothed part 10a. This confirmation enables the defective sleeves 10b to be eliminated. After the confirmation, the sleeve 10b is integrated with the toothed part 10a to form a single unit, and then the teeth can be machine around the circumference of the toothed part 10a. This saves any time which is wasted in machining teeth to no avail.

In the following section, the second preferred embodiment of the present invention is described by reference to FIGS. 7 and 8. In this section, the description is confined to the differences from the first embodiment. All sections which are identical to those of the first embodiment is assigned the same numerical labels.

Figure 7:
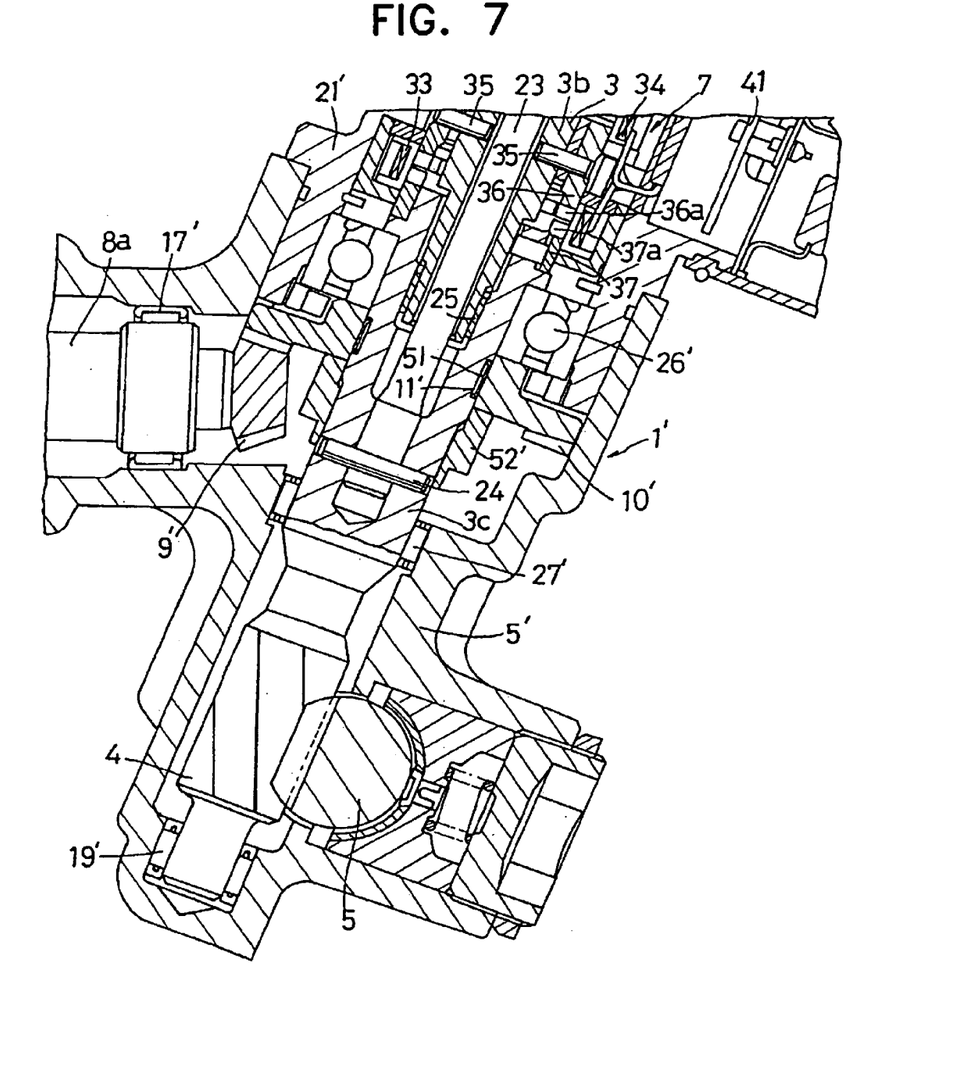
FIG. 7: A cross sectional view of the second preferred embodiment of the motor operated power steering device of the present invention.
Figure 8:
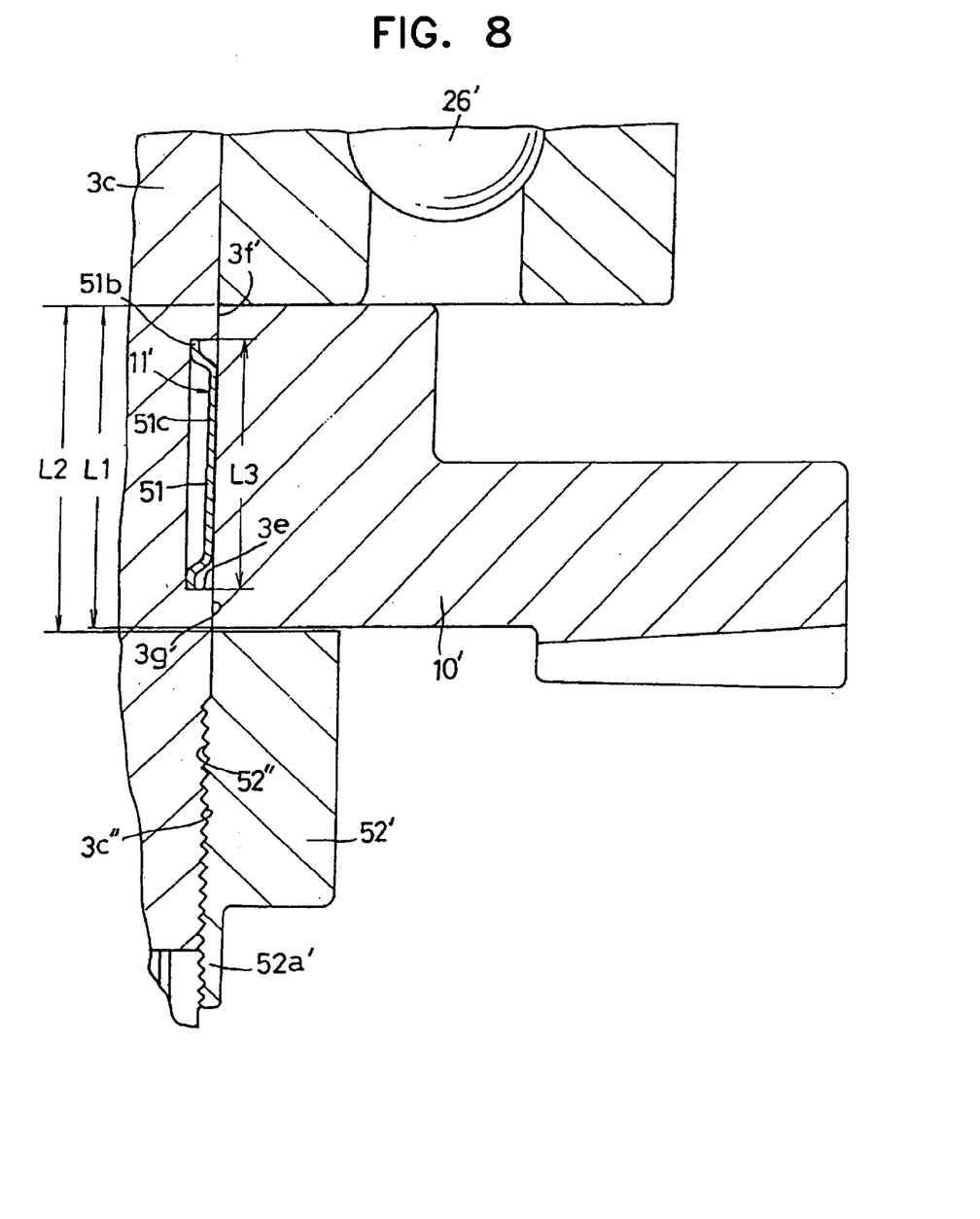
FIG. 8: A cross sectional view of a crucial part of the second preferred embodiment of the motor operated power steering device of the present invention.

The motor operated power steering device 1' shown in FIG. 7 comprises a driving bevel gear 9', which is linked to the output shaft 8a of a steering assistance motor, and a driven bevel gear 10', which meshes with the driving bevel gear 9', in order to supply steering assistance force in accordance with the steering torque transmitted by the steering shaft 3. Rotation of the motor is transmitted to the steering shaft 3 by way of these two bevel gears (9',10'. The steering torque transmitted by the steering shaft 3 can be detected by a torque sensor 7 in the same way as in the first embodiment outlined above. The steering assistance motor is driven in response to a signal output from the torque sensor 7 in accordance with the transmitted torque. The steering assistance force is supplied by transmitting the rotation of the motor to the steering shaft 3 through the driving bevel gear 9' and the driven bevel gear 10'. The housing 21' of the torque sensor 7 is formed as a single unit with the rack housing 5' which covers the rack 5. The aforementioned motor output shaft 8a is supported by the rack housing 5' through a bearing 17'. The third shaft section 3c of the steering shaft 3 is supported both by the housing 21' of the torque sensor 7 and the rack housing 5' through three bearings 26',27',19'. A pinion 4 is formed as a part of the outer circumference of the third shaft section 3c.

The aforementioned driven bevel gear 10' is fitted around the outer circumference of the third shaft section 3c through a torque limiter 11'. As shown in FIG. 8, the torque limiter 11' comprises a torque setting member 51. The torque setting member 51 is fitted in between the outer circumference of the third shaft section 3c and the inner circumference of the driven bevel gear 10' such that it is subject to diametric deformation. As in the first embodiment outlined above, a tolerance ring having a ring 51b and projections 51c shown in FIGS. 5(A) and 5(B) is used as the torque setting member 51. The torque setting member 51 causes a diametric force corresponding to its diametric deformation to act on the steering shaft 3 and the driven bevel gear 10'. In this second preferred embodiment, the third shaft section 3c is forced into the driven bevel gear 10'. The press fit section constitutes the torque limiter 11'.

A diametric force corresponding to the diametric deformation of the torque setting member 51 is caused to act on the steering shaft 3 and the driven bevel gear 10', and thus frictional resistance between the torque setting member 51 and the steering shaft 3 and frictional resistance between the torque setting member 51 and the driven bevel gear 10' are generated. The smaller of these two frictional resistances is treated as the first frictional resistance. By forcing the steering shaft 3 into the driven bevel gear 10', a second frictional resistance is generated between the steering shaft 3 and the driven bevel gear 10'. The first frictional resistance is made greater than the second frictional resistance.

The driving and driven bevel gears 9',10' can be machined either as straight bevels or as spiral bevels. In the case of spiral bevels, the driven bevel gear 10' is subject to axial force when the rotation of the driving bevel gear 9' is transmitted to the steering shaft 3. Restricting parts are provided in order that axial movement of the driven bevel gear 10' due to the axial force with respect to the steering shaft 3 against the total of the frictional resistance between the driven bevel gear 10' and the torque setting member 51 and the frictional resistance between the driven bevel gear 10' and the third shaft section 3c is restricted. The aforementioned bearing 26', which supports the third shaft section 3c in the housing 21' of the torque sensor 7, and a nut 52', whose female threaded section 52" is screwed onto the male threaded section area 3c" around the outer circumference of the third shaft section 3c, serve as the restricting parts. The bearing 26' and the nut 52' are positioned at a distance from each other in an axial direction. The driven bevel gear 10' is positioned between the bearing 26' and the nut 52'. It is desirable that the difference between the axial length L1 of the driven bevel gear 10' and the axial gap L2 between the bearing 26' and the nut 52' is made as small as possible so as not to impede the relative rotation of the driven bevel gear 10' and the steering shaft 3. The gap can be set to something, for example, between zero and several tens of micrometers. After assembly, the narrow part 52a' in one end of the nut 52' is caulked. The nut 52' is then locked with respect to the steering shaft 3.

The torque setting member 51 is positioned in a circumferential groove 3e, which is formed in the outer circumference of the third shaft section 3c. The axial length L3 of the circumferential groove 3e is made smaller than the axial length L1 of the driven bevel gear 10'. The circumferential groove 3e is positioned between the two axial ends of the driven bevel gear 10'. The outer circumference of the third shaft section 3c is forced into the driven bevel gear 10' at the outsides of the two axial ends of the torque setting member 51. On the outer circumference of the third shaft section 3c, the parts 3f',3g', which are forced into the driven bevel gear 10', thus serve as restricting parts. In other words, by the restricting parts 3f',3g', the diametric movement, against the diametric force caused by the torque setting member 51, of the driven bevel gear 10' with respect to the steering shaft 3 is restricted.

In the power steering device 1' described above, the total of the first frictional resistance, which corresponds to the diametric deformation of the torque setting member 51, and the second frictional resistance, which corresponds to the press fit force with which the steering shaft 3 is forced into the driven bevel gear 10', serve to transmit torque between the steering shaft 3 and the driven bevel gear 10'. The limit torque value is determined in accordance with the total of the first and second frictional resistances. In the second preferred embodiment, the frictional resistance between the torque setting member 51 and the steering shaft 3 is made smaller than the frictional resistance between the torque setting member 51 and the driven bevel gear 10'. The torque value at the point when the torque setting member 51 and the steering shaft 3 start to slip relative to each other and the steering shaft 3 and the driven bevel gear 10' also start to slip relative to each other is the limit torque value of the torque limiter 11'. This limit torque value can be found by testing.

In the power steering device 1' described above, when a torque in excess of the limit torque value of the torque limiter 11' is applied to the steering shaft 3 as a result, for example, of the road wheel of the driver's vehicle mounting a curb, the torque setting member 51 slips relative to the steering shaft 3 and the steering shaft 3 slips relative to the driven bevel gear 10'. This dual slippage gives rise to the relative rotation between the steering shaft 3 and the driven bevel gear 10'. This prevents the steering assistance motor from being damaged.

In the power steering device 1' described above, the torque limiter 11' is fitted in between the steering shaft 3 and the driven bevel gear 10'. Thus, even if rotation of the output shaft 8a of the motor is locked, the torque limiter 11' continues to function and this enables the steering wheel to continue to be used with effect. Similarly, if rotation of the driven bevel gear 10' is locked as a result of damage to the teeth of the driven bevel gear 10', the torque limiter 11' can continue to function. Again, since the limit torque value can be set without regard to the deceleration ratio of rotational force of the motor between the driven bevel gear 10' and the driving bevel gear 9', it can be set precisely to a value within the desired setting range. There is also no need to set the limit torque as precisely as is the case when the torque limiter is incorporated into the motor. Furthermore, even if each of distinct types of vehicle has a different deceleration ratio of the rotational force of the motor, there is no need to set the limit torque to a different value for each type of vehicle.

In the power steering device 1' described above, the only component part, which is required to configure the torque limiter 11' with the prior existence of the steering shaft 3 and the driven bevel gear 10', is a torque setting member 51. This enables a significant reduction in the number of component parts and the number of man/machine hours required at the manufacturing stage.

In the power steering device 1' described above, the limit torque can be set in accordance with the total of the first frictional resistance, which corresponds to the diametric deformation of the torque setting member 51, and the second frictional resistance, which corresponds to the press fit force with which the steering shaft 3 is forced into the driven bevel gear 10'. In this case, the torque setting member 51 can be made smaller than in case in which the limit torque is set only by reference to the first frictional resistance, and thus the whole device 1' can be made more compact. Also, in this case, the press fit force can be set more roughly than in case in which the limit torque is set only by reference to the press fit force. There is thus no need to machine the inner circumference of the driven bevel gear 10' and the outer circumference of the steering shaft 3 at the press fit area with extremely accuracy. Under this circumstances, there is no difficulty in setting the limit torque value to a value within the desired range. By making the first frictional resistance greater than the second frictional resistance, the press fit force can be set more roughly. This makes it easier to set the limit torque to a value within the desired range. The limit torque can also be set to correspond to the diametric deformation of the torque setting member 51 and the press fit force with which the steering shaft 3 is forced into the driven bevel gear 10'. Therefore, it is possible to prevent the limit torque value at the time when the steering shaft 3 rotates to the clockwise direction and the limit torque value at the time when the steering shaft 3 rotates to the counterclockwise direction from being different to each other, even when there is an axial force acting on the driven bevel gear 10' during the transmission of the rotational force of the motor.

In the power steering device 1' described above, the ratio of increase in the diametric force to the diametric deformation of the torque setting member 51 is, as in the first embodiment, smaller than that at the time when the diametric force increases in proportion to the diametric deformation. Thereby, even if the diametric deformation of the torque setting member changes from a design value by the machining tolerances of the outside diameter of the steering shaft 3 and the inside diameter of the driven bevel gear 10', it can be possible to reduce the change in the diametric force caused by the torque setting member 51. The limit torque, which is determined in accordance with the diametric force and in accordance with the press fit force with which the steering shaft 3 is forced into the driven bevel gear 10', can thus be set precisely to a value within the desired setting range. This makes a limit torque value adjustment mechanism unnecessary, eliminates the time taken adjusting, and simplifies the overall configuration of the device 1' by reducing the number of component parts.

In the power steering device 1' described above, the bearing 26' and the nut 52' are used to restrict the axial movement of the driven bevel gear 10' with respect to the steering shaft 3 when the driven bevel gear 10' is subjected to axial force during transmission of the rotational force of the motor. This prevents the driven bevel gear 10' from moving out of its set position, so that it prevents changes in the backlash and in the degree of engagement between the driven bevel gear 10' and the driving bevel gear 9'. There is thus no change in the feel of the steering. Also, when the driven bevel gear 10' is fitted to the steering shaft 3 through the torque setting member 51, the bearing 26' can be used to determine the axial position of the driven bevel gear 10' with respect to the steering shaft 3. This enables the required level of precision to be achieved with ease at the assembly stage.

In the power steering device 1' described above, the diametric movement of the driven bevel gear 10' restricted by the restricting parts 3f',3g'. This prevents the axial orientation of the driven bevel gear 10' from tilting with respect to the axial orientation of the steering shaft 3. This prevents any change in the backlash and in the degree of engagement between the driven bevel gear 10' and the driving bevel gear 9', ensuring that there is no need in the feel of the steering.

In each of the preferred embodiments outlined above, the outer circumference of the steering shaft 3 is treated to harden the surface which comes in contact with the torque setting member 51, so that it is harder than the torque setting member 51. This prevents wear at times when the steering shaft 3 slips relative to the torque setting member 51. Grease is filled between the outer circumference of the steering shaft 3 and the inner circumference of the torque setting member 51 so as to prevent the wear of the steering shaft 3 during relative rotation. The effect of change in the frictional resistance caused by the grease are much smaller than the diametric force caused by the torque setting member 51, so that it can be ignored.

Application of the present invention is not limited to the preferred embodiments outlined above. In the above embodiments, the present invention is applied to rack and pinion type motor operated power steering devices. However, the present invention can be applied to other type of power steering device such as a ball screw type power steering device. Similarly, the gear fitted onto the steering shaft is not limited to a worm wheel or a bevel gear, that is, other type of gear can be used. Again, the torque setting member is not limited to a tolerance ring, it can be anything that served the purpose of applying a diametric force corresponding to its own diametric deformation to the steering shaft and the gear.

What is claimed is:

1. A motor operated power steering device, comprising:

a steering shaft;

a gear fitted around the outer circumference of the steering shaft;

a steering assistance motor which transmits a rotational force via the gear to the steering shaft; and a torque limiter, fitted in between the steering shaft and the gear, and having a diametric direction defined by a diameter of the torque limiter;

wherein:

the torque limiter includes a torque setting member, which is subject to diametric deformation along the diametric direction as a result of being fitted in between the outer circumference of the steering shaft and the inner circumference of the gear;

the torque setting member includes a ring with a circumference around which plural projections are spaced and project diametrically;

the torque setting member causes a diametric force corresponding to its diametric deformation to act on the steering shaft and the gear;

a limit torque value of the torque limiter, corresponds to the diametric deformation of the torque setting member;

when the diametric deformation of the torque setting member is less than a specific value, the diametric force increases in proportion to the diametric deformation;

when the diametric deformation exceeds the specific value, a ratio of increase in the diametric force to the diametric deformation is smaller than when the diametric deformation is less than the specific value; and the diametric deformation of the torque setting member is a value in a range in which the diametric deformation exceeds the specific value.

2. The motor operated power steering device according to claim 1, further comprising:

means for restricting an axial movement of the gear with respect to the steering shaft in the event that the gear is subjected to axial force when the gear transmits the rotational force.

3. The motor operated power steering device according to claim 1, wherein:

the torque setting member includes two axial ends; and the motor operated power steering device further comprises means for restricting a diametric movement of the gear with respect to the steering shaft, disposed outside the two axial ends of the torque setting member.

* * * * *

UNITED STATES PATENT AND TRADEMARK OFFICE
CERTIFICATE OF CORRECTION

PATENT NO. : 6,854,556 B1
DATED : February 15, 2005
INVENTOR(S) : Tatsuhiro Yamamoto et al.

It is certified that error appears in the above-identified patent and that said Letters Patent is hereby corrected as shown below:

Drawings,
Sheet 2, delete Figure 3 and insert in place thereof the following new Figure 3:

Signed and Sealed this

Twenty-eighth Day of June, 2005

JON W. DUDAS
*Director of the United States Patent and Trademark Office*

FIG. 2

FIG. 3